(12) United States Patent
Robinson et al.

(10) Patent No.: US 7,464,059 B1
(45) Date of Patent: Dec. 9, 2008

(54) SYSTEM AND METHOD FOR PURCHASE BENEFITS AT A POINT OF SALE

(75) Inventors: Timothy L. Robinson, Reston, VA (US);
Bradford R. Schildt, Boulder, CO (US);
Tennille V. Goff, Springfield, VA (US);
Daniel J. Corwin, Ashburn, VA (US);
Timothy Neil Watson, Alexandria, VA (US)

(73) Assignee: YT Acquisition Corporation, Delray Beach, FL (US)

( * ) Notice: Subject to any disclaimer, the term of this patent is extended or adjusted under 35 U.S.C. 154(b) by 168 days.

(21) Appl. No.: 11/005,079

(22) Filed: Dec. 7, 2004

Related U.S. Application Data (63) Continuation-in-part of application No. 10/829,448, filed on Apr. 22, 2004, now Pat. No. 7,082,415, which is a continuation-in-part of application No. 10/251,305, filed on Sep. 20, 2002, now Pat. No. 7,269,737.

(60) Provisional application No. 60/324,229, filed on Sep. 21, 2001.

(51) Int. Cl.
*G06F 17/60* (2006.01)
(52) U.S. Cl. .......................... 705/67; 713/186
(58) Field of Classification Search .......... 705/67; 713/186
See application file for complete search history.

(56) References Cited

U.S. PATENT DOCUMENTS

| | | | |
|---|---|---|---|
| 4,230,214 A | 10/1980 | Cortez | |
| 4,359,631 A | 11/1982 | Lockwood et al. | |
| 4,553,222 A | 11/1985 | Kurland et al. | |
| 4,716,593 A | 12/1987 | Hirai et al. | |
| 4,879,747 A | 11/1989 | Leighton et al. | |
| 4,915,205 A | 4/1990 | Reid et al. | |
| 4,995,081 A | 2/1991 | Leighton et al. | |
| 5,042,073 A | 8/1991 | Collot et al. | |
| 5,086,389 A | 2/1992 | Hassett et al. | |
| 5,144,553 A | 9/1992 | Hassett et al. | |
| 5,274,695 A | 12/1993 | Green | |
| 5,280,527 A | 1/1994 | Gullman et al. | |
| 5,289,183 A | 2/1994 | Hassett et al. | |
| 5,335,288 A | 8/1994 | Faulkner | |
| 5,351,187 A | 9/1994 | Hassett | |
| 5,352,876 A | 10/1994 | Watanabe et al. | |
| 5,386,104 A | 1/1995 | Sime | |
| 5,412,738 A | 5/1995 | Brunelli et al. | |

(Continued)

FOREIGN PATENT DOCUMENTS

EP 0762261 A2 3/1997

(Continued)

OTHER PUBLICATIONS

Video Insight. http://www.video-insight.com/dvr221.htm.

(Continued)

*Primary Examiner*—Pierre E Elisca
(74) *Attorney, Agent, or Firm*—Pepper Hamilton LLP (57) ABSTRACT

A system and method of providing users with an accessible system and convenient method for conducting purchase benefit transactions. When enrolling in a biometric authorization system, a user may authorize the system to apply for purchase benefits on the user's behalf at subsequent transactions.

49 Claims, 3 Drawing Sheets

U.S. PATENT DOCUMENTS

| | | | |
|---|---|---|---|
| 5,450,980 | A | 9/1995 | Laidlaw |
| 5,453,601 | A | 9/1995 | Rosen |
| 5,455,407 | A | 10/1995 | Rosen |
| 5,483,601 | A | 1/1996 | Faulkner |
| 5,485,510 | A | 1/1996 | Colbert |
| 5,523,551 | A | 6/1996 | Scott |
| 5,546,523 | A | 8/1996 | Gatto |
| 5,581,630 | A | 12/1996 | Bonneau, Jr. |
| 5,594,806 | A | 1/1997 | Colbert |
| 5,598,474 | A | 1/1997 | Johnson |
| 5,602,933 | A | 2/1997 | Blackwell et al. |
| 5,613,012 | A | 3/1997 | Hoffman et al. |
| 5,615,217 | A | 3/1997 | Horne et al. |
| 5,615,277 | A | 3/1997 | Hoffman |
| 5,657,389 | A | 8/1997 | Houvener |
| 5,679,938 | A | 10/1997 | Templeton et al. |
| 5,688,974 | A | 11/1997 | Devine et al. |
| 5,696,739 | A | 12/1997 | Chang |
| 5,719,950 | A | 2/1998 | Osten et al. |
| 5,722,526 | A | 3/1998 | Sharrard |
| 5,737,439 | A | 4/1998 | Lapsley et al. |
| 5,745,598 | A | 4/1998 | Shaw et al. |
| 5,751,973 | A | 5/1998 | Hassett |
| 5,764,789 | A | 6/1998 | Pare, Jr. et al. |
| 5,790,674 | A | 8/1998 | Houvener et al. |
| 5,790,785 | A | 8/1998 | Klug et al. |
| 5,799,092 | A | 8/1998 | Kristol et al. |
| 5,802,199 | A | 9/1998 | Pare, Jr. et al. |
| 5,805,082 | A | 9/1998 | Hassett |
| 5,805,719 | A | 9/1998 | Pare, Jr. et al. |
| 5,832,464 | A | 11/1998 | Houvener et al. |
| 5,838,812 | A | 11/1998 | Pare, Jr. et al. |
| 5,845,256 | A | 12/1998 | Pescitelli et al. |
| 5,850,442 | A | 12/1998 | Muftic |
| 5,857,079 | A | 1/1999 | Claus et al. |
| 5,864,623 | A | 1/1999 | Messina et al. |
| 5,870,723 | A | 2/1999 | Pare, Jr. et al. |
| 5,872,834 | A | 2/1999 | Teitelbaum |
| 5,893,075 | A | 4/1999 | Plainfield et al. |
| 5,897,616 | A | 4/1999 | Kanevsky et al. |
| 5,914,472 | A | 6/1999 | Foladare et al. |
| 5,927,544 | A | 7/1999 | Kanoh et al. |
| 5,930,804 | A | 7/1999 | Yu et al. |
| 5,933,816 | A | 8/1999 | Zeanah et al. |
| 5,943,423 | A | 8/1999 | Muftic |
| 5,982,914 | A | 11/1999 | Lee et al. |
| 5,984,366 | A | 11/1999 | Priddy |
| 6,009,411 | A | 12/1999 | Kepecs |
| 6,012,039 | A | 1/2000 | Hoffman et al. |
| 6,028,950 | A | 2/2000 | Merjanian |
| 6,040,783 | A | 3/2000 | Houvener et al. |
| D425,800 | S | 5/2000 | Shin |
| 6,061,660 | A | 5/2000 | Eggleston et al. |
| 6,070,141 | A | 5/2000 | Houvener et al. |
| 6,070,147 | A | 5/2000 | Harms et al. |
| 6,092,192 | A | 7/2000 | Kanevsky et al. |
| 6,094,632 | A | 7/2000 | Hattori |
| 6,105,010 | A | 8/2000 | Musgrave |
| 6,119,932 | A | 9/2000 | Maloney et al. |
| 6,148,091 | A | 11/2000 | DiMaria |
| 6,149,055 | A | 11/2000 | Gatto |
| 6,154,879 | A | 11/2000 | Pare, Jr. et al. |
| 6,157,314 | A | 12/2000 | Loftus |
| 6,160,903 | A | 12/2000 | Hamid et al. |
| 6,161,059 | A | 12/2000 | Tedesco et al. |
| 6,161,090 | A | 12/2000 | Kanevsky et al. |
| 6,175,922 | B1 | 1/2001 | Wang |
| 6,181,807 | B1 | 1/2001 | Setlak et al. |
| 6,192,142 | B1 | 2/2001 | Pare, Jr. et al. |
| 6,196,460 | B1 | 3/2001 | Shin |
| 6,202,055 | B1 * | 3/2001 | Houvener et al. ............ 705/44 |
| 6,222,914 | B1 | 4/2001 | McMullin |
| 6,230,148 | B1 | 5/2001 | Pare et al. |
| 6,233,564 | B1 | 5/2001 | Schulze, Jr. |
| 6,246,751 | B1 | 6/2001 | Bergl et al. |
| 6,269,348 | B1 | 7/2001 | Pare, Jr. et al. |
| 6,282,658 | B2 | 8/2001 | French et al. |
| 6,307,955 | B1 * | 10/2001 | Zank et al. ................. 382/121 |
| 6,307,956 | B1 | 10/2001 | Black |
| 6,310,966 | B1 | 10/2001 | Dulude et al. |
| 6,314,169 | B1 | 11/2001 | Schelberg, Jr. et al. |
| 6,317,723 | B1 | 11/2001 | Walker et al. |
| 6,317,834 | B1 | 11/2001 | Gennaro et al. |
| 6,321,339 | B1 | 11/2001 | French et al. |
| 6,327,573 | B1 | 12/2001 | Walker et al. |
| 6,330,543 | B1 | 12/2001 | Kepecs |
| 6,332,134 | B1 | 12/2001 | Foster |
| 6,334,109 | B1 | 12/2001 | Kanevsky et al. |
| 6,334,112 | B1 | 12/2001 | Walker et al. |
| 6,334,113 | B1 | 12/2001 | Walker et al. |
| 6,341,169 | B1 | 1/2002 | Cadorette, Jr. et al. |
| 6,345,263 | B1 | 2/2002 | Matsumoto et al. |
| 6,363,485 | B1 * | 3/2002 | Adams et al. ............... 713/186 |
| 6,366,682 | B1 | 4/2002 | Hoffman et al. |
| 6,370,649 | B1 | 4/2002 | Angelo et al. |
| 6,381,344 | B1 | 4/2002 | Smithies et al. |
| 6,389,401 | B1 | 5/2002 | Kepecs |
| 6,397,126 | B1 | 5/2002 | Nelson |
| 6,397,198 | B1 | 5/2002 | Hoffman et al. |
| 6,405,125 | B1 | 6/2002 | Ayed |
| 6,415,262 | B1 | 7/2002 | Walker et al. |
| 6,422,464 | B1 | 7/2002 | Terranova |
| 6,424,249 | B1 | 7/2002 | Houvener |
| 6,433,818 | B1 | 8/2002 | Steinberg et al. |
| 6,446,044 | B1 | 9/2002 | Luth et al. |
| 6,463,127 | B1 | 10/2002 | Maier et al. |
| 6,466,917 | B1 | 10/2002 | Goyal et al. |
| 6,470,233 | B1 | 10/2002 | Johnson, Jr. |
| 6,470,322 | B1 | 10/2002 | Walker et al. |
| 6,477,509 | B1 | 11/2002 | Hammons et al. |
| 6,496,595 | B1 | 12/2002 | Puchek et al. |
| 6,497,360 | B1 | 12/2002 | Schulze |
| 6,498,970 | B2 | 12/2002 | Colmenarez et al. |
| 6,507,912 | B1 | 1/2003 | Matyas et al. |
| 6,522,772 | B1 | 2/2003 | Morrison et al. |
| 6,523,741 | B1 | 2/2003 | DiMaria et al. |
| 6,529,871 | B1 | 3/2003 | Kanevsky et al. |
| 6,529,878 | B2 | 3/2003 | De Rafael et al. |
| 6,532,459 | B1 | 3/2003 | Berson |
| 6,539,282 | B2 | 3/2003 | Metcalf et al. |
| 6,542,874 | B1 | 4/2003 | Walker et al. |
| 6,554,705 | B1 | 4/2003 | Cumbers |
| 6,559,776 | B2 | 5/2003 | Katz |
| 6,567,787 | B1 | 5/2003 | Walker et al. |
| 6,581,042 | B2 | 6/2003 | Pare et al. |
| 6,591,224 | B1 | 7/2003 | Sullivan et al. |
| 6,594,376 | B2 | 7/2003 | Hoffman et al. |
| 6,636,973 | B1 | 10/2003 | Novoa et al. |
| 6,646,568 | B2 | 11/2003 | MacPhail et al. |
| 6,647,372 | B1 | 11/2003 | Brady et al. |
| 6,650,999 | B1 | 11/2003 | Brust et al. |
| 6,651,063 | B1 | 11/2003 | Vorobiev |
| 6,653,946 | B1 | 11/2003 | Hassett |
| 6,655,585 | B2 | 12/2003 | Shinn |
| 6,662,166 | B2 | 12/2003 | Pare et al. |
| 6,685,088 | B1 | 2/2004 | Royer et al. |
| 6,694,300 | B1 | 2/2004 | Walker et al. |
| 6,695,206 | B2 | 2/2004 | Ross |
| 6,715,673 | B2 | 4/2004 | Fulcher et al. |
| 6,715,674 | B2 | 4/2004 | Schneider et al. |
| 6,748,365 | B1 | 6/2004 | Quinlan et al. |
| 6,755,344 | B1 | 6/2004 | Mollett et al. |
| 6,792,334 | B2 | 9/2004 | Metcalf et al. |
| 6,792,422 | B1 | 9/2004 | Stride et al. |

| | | |
|---|---|---|
| 6,796,492 B1 | 9/2004 | Gatto |
| 6,796,499 B1 | 9/2004 | Wang |
| 6,827,260 B2 | 12/2004 | Stoutenburg et al. |
| 6,854,642 B2 | 2/2005 | Metcalf et al. |
| 6,865,544 B1 * | 3/2005 | Austin .................. 705/14 |
| 6,873,969 B2 | 3/2005 | Stone et al. |
| 6,886,742 B2 | 5/2005 | Stoutenburg et al. |
| 6,935,559 B2 | 8/2005 | Mollett et al. |
| 6,980,670 B1 * | 12/2005 | Hoffman et al. ............ 382/115 |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Pucheck et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0194128 A1 | 12/2002 | Maritzen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Pucheck et al. |
| 2003/0046228 A1 | 3/2003 | Berney |
| 2003/0055727 A1 | 3/2003 | Walker et al. |
| 2003/0067396 A1 | 4/2003 | Hassett |
| 2003/0075287 A1 | 4/2003 | Weik |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0144956 A1 | 7/2003 | Yu et al. |
| 2003/0150907 A1 | 8/2003 | Metcalf et al. |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254840 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |

FOREIGN PATENT DOCUMENTS

| | | | |
|---|---|---|---|
| JP | 358044583 A | | 3/1983 |
| JP | 2003281426 A | * | 10/2003 |
| WO | WO 01/20525 A1 | | 3/2001 |

OTHER PUBLICATIONS

TMCnet. Cernium Installs Perceptrak Behavior Recognition Software In Public Parking Garage In Yonkers. http://www.tmcnet.com/usubmit/2003/Dec/1021669.htm. Dec. 2003.

City of Aspen. Parking. http://www.aspenpitkin/com/depts/61/payanddisplay.cfm.

SmartCity. SmartCity Card Solutions. http://www.coinamatic.com/coinamatic_group/html/apartment_laundry_services/smartcity/Products/p4.html.

TranCore. TransCore Access Control System First to Successfully Combine Biometrics and RFID. http://www.transcore.com/news/news050314.htm. Mar. 2005.

James P. Holmes et al. A Performance Evaluation of Biometric Identification Devices. Sandia Report. Jun. 1991.

S. Davies. Touching Big Brother. How Biometric Technology Will Fuse Flesh and Machine. Information Technology & People. vol. 7 (4) 1994.

Lawrence Aragon. Show me some ID, PC Week Online (http://www.zdnet.com/pcweek/0112/12bio.html) Jan.1998.

Gerald Lazar. Agencies Scan Biometrics for Potential Applications. FCW.com (http://www.fcw.com.pubs.few 1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty/jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/ebl.html. Aug. 1998.

Biometric Technology Today (Btt). vol. 6(5) Sep. 1998.

Biometric Digest. Mar. 1998.

Biometrics in Human Services. vol. 2(1) Feb. 1998.

"The Biometric Bar Tab Project." http://www.csee.wyu.edu/~wise/biometric/index.htm, including Dec. 9, 2002 Proposal and May 5, 2003 Team Report.

Office of NYS Attorney General Eliot Spitzer, Financial Giant Joints Fight Against Online Gambling. Press Release. http://www.oag.state.ny.us/press/2002/jun/jun14a_02.html. Jun. 2002.

Zions Bank. Cards for Any Business Occasion. http://www.zionsbank.com/bank_cards.jsp?leftNav=bf_bfinance &topNav=bfinance.

ABSA. Purchasing Credit Card. http://www.absa.co.za/Corporate/0,2999,2210,00.html.

Visa U.S.A. Visa Purchasing. http://www.usa.visa.com/corporate/corporate_solutions/payment/visa_purchasing.html?it=cl/corporate/corporate_solutions/index%2Ehtml|Visa%20Purchasing%20.

University of Wisconsin-Green Bay. Purchasing Department: Purchasing Card. http://www.uwgb/edu/Purchasing/purchasingCard/procurement0.7.htm.

Reference Guides Glossary Terms (Online Glossary Terms and Definitions). Merchant Glossary: Merchant Category Code (MCC) (Merchant Category Code) (MCC) Help). http://glossary.reference-guides.com/Merchant/Merchant_Category_Code_MCC/. 2003.

University of Denver. Purchasing Card User Guide. http://www.du.edu/purchasing/purcard.html#2.%20HOW%20DOES%20THE%20CARD%20WORK?.

Williams College Controller's Office. Purchasing Card Procedures. http://www.williams.edu/admin/controller/pcard.html#whatis. Jan. 2005.

Arizona State University. The Purchasing Card: A Guide for Users. http://www.asu.edu/purchasing/pdf/purchcard.pdf. Jan. 2005.

Washington Post—For Dining In, Security Is the Order of the Day; Post 9/11 Concerns Thwarting Deliverymen: [Final Edition], 2004.

MophoTouch™—Multi-Application Finger Identification in the Palm of Your Hand, Sagem Morpho, Inc., 1999.

IBM Technical Disclosure Bulletin, Title: selective receipt of document elements in an electronic mail system, Issue No. 429, TDB-ACC-No. NNRD429177, Jan. 2000, UK.

* cited by examiner

SYSTEM AND METHOD FOR PURCHASE BENEFITS AT A POINT OF SALE

This application is a continuation-in-part of application Ser. No. 10/829,448, filed Apr. 22, 2004, now U.S. Pat. No. 7,082,415 which is a continuation-in-part of application Ser. No. 10/251,305, filed Sep. 20, 2002, now U.S. Pat. No. 7,269,737 which claims domestic priority from provisional application No. 60/324,229, filed Sep. 21, 2001. Each above-identified application is incorporated by reference herein, in its entirety, for all purposes.

FIELD OF THE INVENTION

This application relates generally to a system and method for conducting purchase benefit transactions at a point of sale by means of biometric authorization. More particularly, the present invention relates to a system and method for allowing individuals to authorize purchase benefits, such as rebates, warranties, and consumer rewards, biometrically at a point of sale.

BACKGROUND OF THE INVENTION

Generally, an individual conducting a purchase benefit transaction, such as a rebate, a warranty, or a consumer reward, has to undertake several steps once the associated item has been purchased. A consumer may have to obtain and complete a form, locate the relevant receipt, and/or retrieve a product identifier, such as a universal product code (UPC), and mail this information to the benefit provider. A consumer may easily misplace rebate forms and receipts, discard product packaging before retrieving product identifiers, or simply forget to take the steps necessary to complete the purchase benefit. Even if consumers complete the required steps, they may not obtain the desired results. For example, mailed rebate checks are often unclearly marked and may be discarded as junk mail. In regard to warranties, consumers often have no way of verifying if their registration information reached the benefit provider. What is needed are better systems and methods for conducting purchase benefits.

SUMMARY OF THE INVENTION

The present invention addresses the aforementioned needs by providing users with an accessible system and convenient method for conducting purchase benefit transactions. When enrolling in a biometric authorization system, a user may authorize the system to apply for purchase benefits on the user's behalf at subsequent transactions.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As aforementioned, the present invention provides a system and method for biometrically conducting purchase benefit transactions. A purchase benefit transaction may be a rebate, a warranty, a consumer reward, or the like provided to a user in association with a purchased item. Typically, purchase benefits are offered by a benefit provider, which may be a payor or a warrantor, such as a manufacturer or third-party intermediary. Benefit providers offer purchase benefits for numerous reasons. For example, offering a rebate may entice a consumer to purchase a product because of a promised refund. However, due to the numerous post-transaction steps required, users may not complete the rebate transaction and may not obtain the refund. By not receiving rebate forms and transaction information, benefit providers do not obtain valuable customer data. Similarly, users may not complete the necessary steps for warranty registration. Typically, a user must fill out a warranty registration card and send it to the benefit provider. Such registration cards are often discarded or overlooked by users and, thus, the benefit provider does not acquire the customer data that warranty registration can provide. Warranty registration may be particularly important if the benefit provider needs to issue product recall information. In addition, other consumer rewards may suffer difficulties similar to those mentioned.

The present invention addresses the aforesaid needs by associating purchase benefit transactions with a biometric authorization system (BAS). User transaction information is stored in one or more electronic records that are associated with a user's biometric data. Transaction information may be stored in an electronic record during or after a transaction. Additionally, transaction information may be converted from physical form (e.g., a paper receipt) to electronic form at a system device, or may be retrieved from one or more storage locations. Regardless of how transaction information is entered into the system, it is stored in electronic form and in association with user biometric data. Depending on the embodiment of the system, stored transaction information may be organized according to varying forms. For example, transaction information may be grouped by transaction, by an item/service identification code, by an item/service related department, by a product identifier, by price, by user, by merchant, by merchant location, by benefit provider, and/or by item/service description.

Storing transaction information in electronic form and in association with user biometric data allows a user to conduct purchase benefit transactions based upon the stored transaction information simply by presenting a biometric. Because most benefit providers currently require individuals to present physical transaction documents (such as receipts, forms, product identifiers, and the like) in a purchase benefit transaction, the present invention provides users with a more convenient method of presenting transaction documents by presenting their electronic transaction records in lieu of traditional physical documents. The present invention also provides users with greater privacy, allowing them to conduct purchase benefit transactions without necessarily having to send their personal information to benefit providers through insecure means, such as via a postal service. For example, warranty registration forms containing personal information are often postcards that may be easily read by mail handlers. Additionally, the invention provides a more secure form of conducting purchase benefit transactions by associating user biometric data with a transaction. Allowing users to present electronic transaction records in a purchase benefit transaction eliminates the need for users to keep track of and present traditional physical transaction records, such as paper receipts, during a purchase benefit transaction.

A user conducts transactions in the BAS by presenting biometric data that is compared to registered biometric data stored at a database. Matching user biometric data to a registered biometric data enables the retrieval of information stored in association with the registered biometric and/or approval of an authorization request depending on the action the user requests in the system. User biometric data may be received by the BAS from a variety of sources, such as from the user directly or from a third-party source, such as a database, token, or the like. In general, a biometric authorization refers to an authorization in which the user provides biometric data to be matched against a biometric record in a database. For example, a user may undergo biometric authorization to complete a financial transaction or to gain access to an age-restricted location. As would be appreciated, the location of the database as well as the specific mechanism by which the biometric data is matched to a particular biometric record would be implementation dependent and would not limit the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud. Alternatively, the BAS may provide non-biometric access for users who have nonviable biometric data or for users who wish to employ the BAS without the use of biometric data.

Depending on the embodiment, the system may also provide a registered user with a system identification number (SID). An SID may serve as an identifier that can be used with or without user biometric data to aid the system in locating the storage location of a user record. Depending on the embodiment of the system, an SID may also serve as a user group identifier that identifies a user as an affiliate of a specified group of users.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan. The biometric data may include fingerprint data, iris data, facial data, voice data, retinal data, hand architecture data, DNA data, or any other physical measurement pertaining to a user's person.

Figure 1:
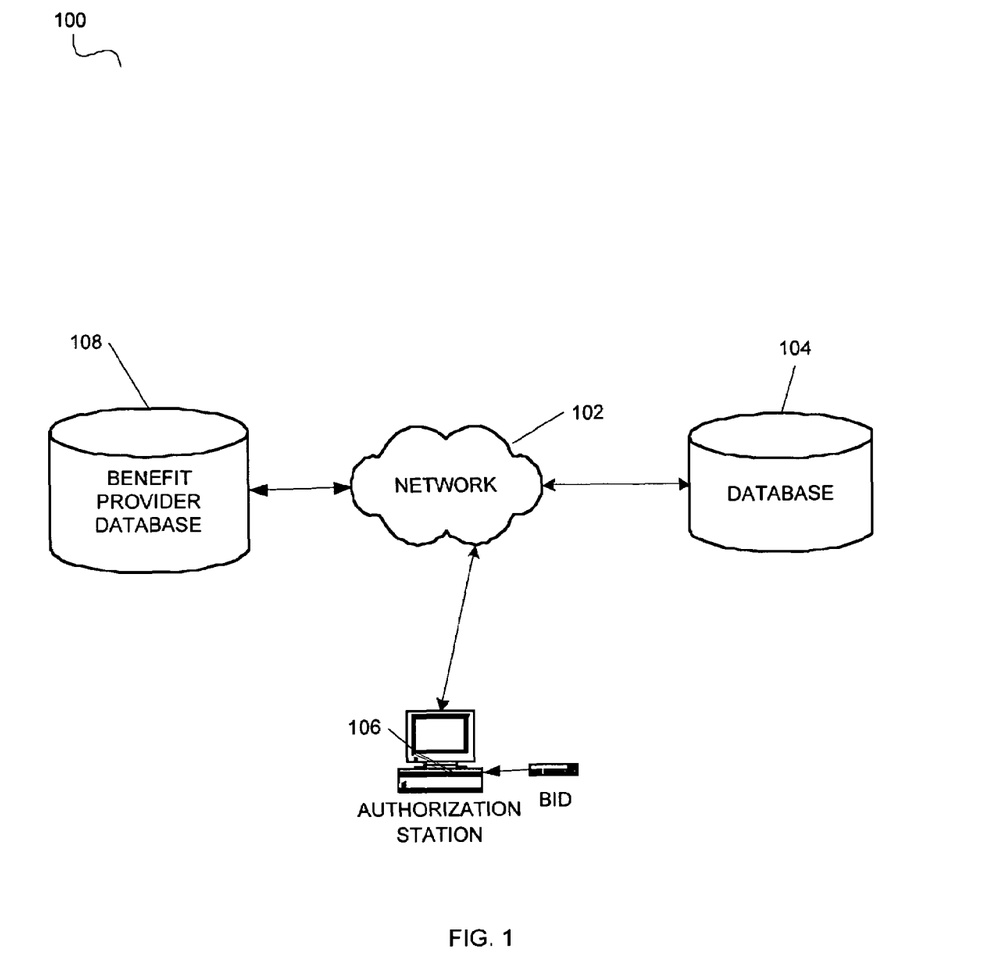
FIG. 1 illustrates a general architecture overview of a biometric authorization system for purchase benefit transactions.

FIG. 1 illustrates a general architecture overview of BAS 100. As will be described in greater detail below, BAS 100 enables a paperless purchase benefit transaction by which users are encouraged to associate their biometric information with their purchase transaction information. Transaction information is stored in database 104 where system user records are stored. Database 104 may represent one or more databases utilized within the system. In one embodiment, database 104 is a central database to which all system user records are stored and from which system user records are accessed for biometric authorization. In another embodiment, database 104 also includes one or more operator databases to which a select set of system operator records are stored and from which a select set of system operator records are accessed for biometric authorization. In an additional embodiment, BAS 100 may also utilize a combination of central databases and one or more operator databases. In general, embodiments utilizing a combination of databases enable increased control of information flow throughout BAS 100. As described in detail below, various examples of information flow configurations within the system can include "open," "closed," and "selectively shared" system models. In still further embodiments, database 104 can further comprise one or more sub-databases that are contained within a particular database. In such embodiments, system user data, system operator data, and other system data may be distributed across multiple databases within database 104.

Benefit provider database 108 may store information pertaining to the purchase benefits transactions. Depending upon the embodiment, benefit provider database 108 may be a manufacturer's database, a third-party database, or a combination thereof. Benefit provider database 108 may store information necessary for purchase benefit transactions, such as user information, purchase benefit information, product information (e.g., price, product identifier, and the like), and merchant information.

A system user record holds system user biometric information and other identity verifying information related to an individual seeking biometric authorization within the system. The information held in such a record may include, by way of illustration and without limitation, a system user's government identification number(s) and corresponding state(s) of issue, home address, email address, a telephone number, and at least one biometric record. When enrolling in BAS 100, a system user may present any number of identity verifying documents or testaments to his identity depending on the implementation of the biometric system. By way of illustration and not of limitation, examples of such documents or testaments include a financial token, a digital image, a video clip, family information, or a DNA sample. Depending on the particular implementation, a system user record can also hold financial account information and/or a user identifier, such as an SID.

A system operator record holds information useful for authenticating an operator, such as a name or ID number, device ID numbers associated with the operator, an address, and a phone number. A system operator may be an individual or entity that has administrative capabilities in a BAS. These capabilities may range from being permitted to oversee a biometric authorization to having access to user records. For example, a system operator may be a store clerk, a merchant, or a system provider administrator. In an alternate embodiment of the present invention, the operator records also hold employer information if the operator is an employee of an employer who is also an operator. In another embodiment of the present invention, operator records hold an operator identifier, such as an SID, and/or operator biometric data. In one scenario, a system operator may need to undergo biometric authorization before administering a user's biometric authorization.

Database 104 and benefit provider database 108 are connected to network 102, which may be, but is not limited to, the Internet. Network 102 comprises connections to at least one authorization station 106 where a system user may be biometrically authorized. Authorization station 106 includes at least one biometric input device (BID) and the necessary means for sending and receiving information to and from a system user and to and from a database. These stations include but are not limited to a vending machine, a kiosk, a personal computer, a user service desk, a point of sale terminal, a telephone, or a wireless device connected via a wireless network. The BID is illustrated in FIG. 1 as peripheral device for purposes of emphasis only. Authorization station 106 could also include an integrated BID. Networks used in additional embodiments include local area networks (LANs), wide area networks (WANs), and telephone networks.

Additional embodiments of the system also comprise connections to one or more third party sources in which system user information, including user biometric data, is verified and/or from which system user information is retrieved. In an additional embodiment, the system may be connected to one or more financial sources in order to facilitate financial biometric authorizations. For example, a system user record stored at database 104 may indicate an account held at a financial institution that is to be debited during a biometrically authorized purchase.

Information transferred in the system may be encrypted. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment, the system is configured as an "open" system, where all information entered into the system is transmitted to and stored in database 104. An open system allows authorization at any authorization station 106 in the system because an open system shares system user information stored in database 104 with all stations.

In an alternate embodiment, the system is configured as a "closed" system, where information entered into the system via a specific operator device is transmitted to and stored in database 104 specific to that operator, and this information is not shared with other authorization stations or other databases. This is referred to as a "closed" system because system users need to enroll in the database in which they would like to perform biometric authorizations. Database 104 in closed systems may communicate with other databases, such as a third-party database or benefit provider database 108. However, all system user information that is enrolled into a particular database is stored in that database. In an alternate embodiment of the closed system, information is stored in a partitioned database 104. System operator related information is stored in system operator-specific partitions and is closed to all other system operators. Only an authorized system operator and authorized entities may access that partition of database 104. In yet an additional embodiment, information stored in one database or database partition may be stored in another database or database partition. Such an embodiment is useful for information protection in the event database information is lost.

In a further embodiment of the present invention, system user information is "selectively shared" and stored in select system multiple-operator databases or select system multiple-operator partitions within database 104. In this embodiment, a group of system operators share data with each other and they can choose whether or not to share system information with other system operators within the system. Such a system is referred to as a "selectively shared" system. This system allows a chain of system operators owned by the same entity or linked in some other manner to share system user information amongst them without sharing that information with all other non-designated system operators registered in the system. Information in such a system may be shared between one or more databases freely or sharing may be monitored by rules set in the one these databases or a combination thereof. By way of illustration and not as a limitation, one system operator might only want to share system user authorization information with one of five system operators in a multi-verifier system or all system operators might not want to send or store system user authorization information to database 104. Such a system allows system operators greater control over information flow while still allowing various user conveniences, such as being able to undergo biometric authorization at any store in a selectively shared chain.

The configuration of the system as an "open" system, "closed" system, or "selectively shared" system illustrates various ways of implementing the principles of the present invention. System configuration might be determined by the system in which user information is used. For example, a merchant who is an operator in the system and who conducts biometrically authorized customer loyalty programs might have a system configured with his own database and authorization stations connected to that database. In this system configuration, the merchant's database files only exist on the database and are retrieved or accessed for biometric authorization only by pre-determined stations connected to the database; therefore, the system would be a "closed" system.

Figure 2:
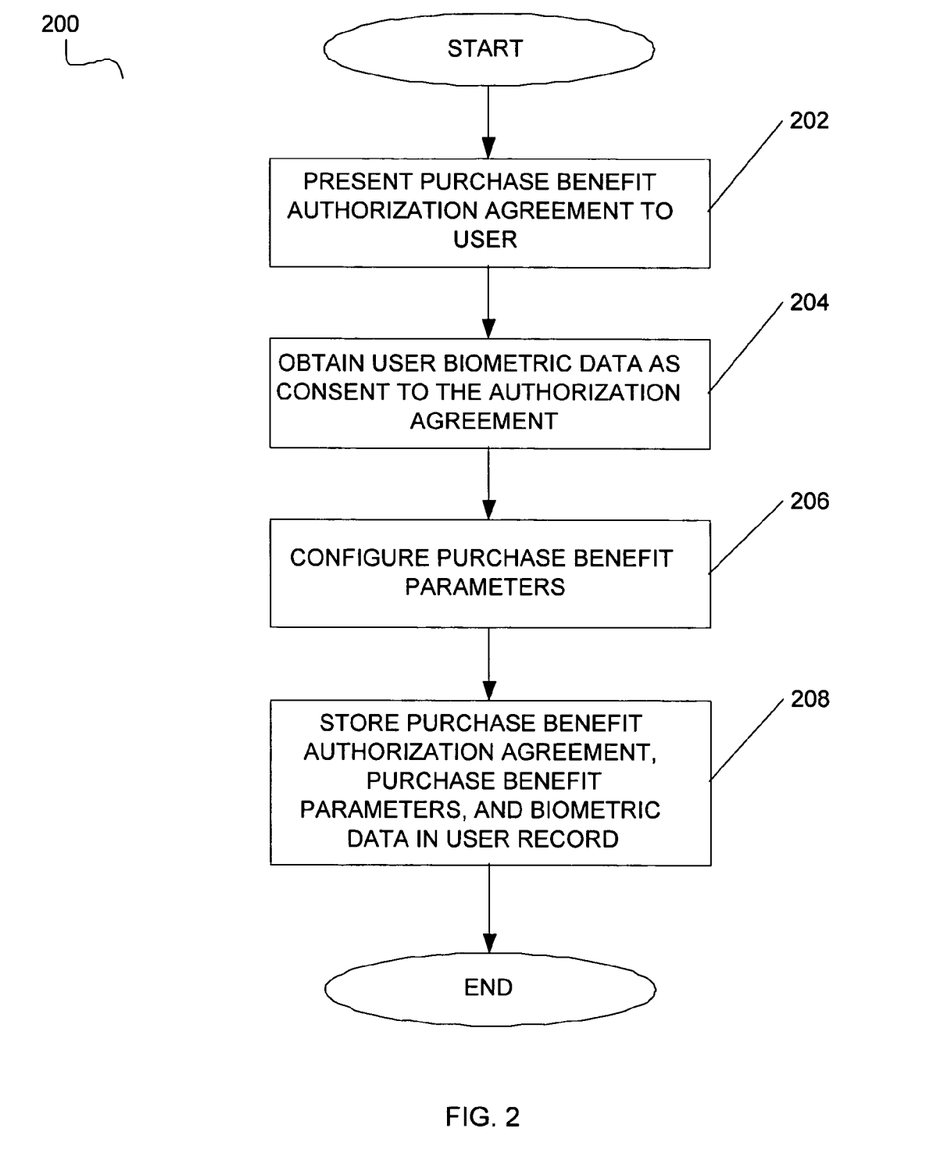
FIG. 2 illustrates a flowchart of a process for providing preauthorization for purchase benefit transactions in a biometric authorization system.

FIG. 2 illustrates a flowchart of a process for providing preauthorization for benefit transactions in BAS 100. At step 202, the user is presented with an authorization agreement. The authorization agreement may allow BAS 100 to handle purchase benefit transactions on the user's behalf. In one embodiment, the authorization agreement is presented to the user when enrolling in BAS 100. In another embodiment, the authorization agreement is presented to the user subsequent to enrollment, for example, during a transaction or while the user updates his user record.

In one embodiment, accepting the authorization agreement provides BAS 100 with legal authority to act upon the user's behalf. Depending upon the legal requirements of a purchase benefit and/or a benefit provider, BAS 100 may need such authority. Additionally, this arrangement may allow BAS 100 to provide additional conveniences to users. For example, a benefit provider may wish to send a rebate check to a user, however, because BAS 100 is applying for the benefit on the user's behalf, the check may be sent to BAS 100, which may in turn deposit the check in the user's financial account. Alternatively, the authorization agreement may provide an affiliated third party with legal authority to act upon the user's behalf.

At step 204, the system obtains user biometric data as consent to the authorization agreement. By consenting to the authorization agreement, the user preauthorizes BAS 100 to apply for benefits on his behalf. In one embodiment, BAS 100 may apply for benefits on the user's behalf only if the user agrees to certain conditions. For example, the user may be required to allow one or more benefit providers to access the user's information for marketing research, product information, or the like. Alternatively, a user may select from among various degrees of compliance, wherein a user's selected level of compliance would determine the quality of a purchase benefit transaction fulfillment. For example, users that authorize a benefit provider to send them advertisements may receive a larger rebate offer than those who do not.

Upon consenting to the authorization agreement, at step 206 a user may configure purchase benefit parameters. Purchase benefit parameters may detail the user's preferred methods for conducting purchase benefit transactions. The user may configure purchase benefit parameters in which BAS 100 applies for all purchase benefits on the user's behalf automatically. For example, during the purchase of an item predisposed for a purchase benefit, BAS 100 may receive transaction information, including the user's biometric data, from a system operator. This information may be received per transaction or per item, or transaction information may be sent in a batch file at a time established by a system operator or BAS 100. Upon receiving the transaction information, BAS 100 may retrieve user information from the user's record and apply for the purchase benefit on the user's behalf.

Alternatively, the user may configure purchase benefit parameters in which BAS 100 requests user approval before conducting purchase benefits on a per-transaction or per-item basis. For example, after enrolling in BAS 100 and consenting to the authorization agreement, the user may purchase an item predisposed to a purchase benefit. During the purchase, BAS 100 may receive transaction information, including the user's biometric data, from a system operator. At the point of sale, the system may notify the user of the purchase benefit and request the user's approval to apply for the purchase benefit. The user may provide approval by presenting biometric data or through another appropriate method. In addition to approving the current purchase benefit transaction, the user may authorize BAS 100 to conduct subsequent benefit transactions of the same nature automatically.

The user may configure BAS 100 to apply only for one or more particular types of purchase benefits. For example, the user may preauthorize BAS 100 to handle all rebate transactions but not warranty registrations. In another scenario, the user may configure BAS 100 to apply for benefits for particular merchants, manufacturers, merchant groups, product types, or the like. For example, a user may preauthorize BAS 100 to conduct purchase benefit transactions for all Best Buy purchases but not for Wal-Mart purchases. In another illustration, the user may configure BAS 100 to conduct warranty registrations for electronics purchases only.

Additionally, a user may specify the method for purchase benefit fulfillment. For rebate transactions, the user may designate how rebate money is to be received, such as via a mailed negotiable instrument, cash at the point of sale, a store-credit token, a store-credit account, a deposit into one or more financial accounts, or the like. In one scenario, the user may allocate a portion of a rebate value to a charitable organization. If a system operator provides a user with a rebate value immediately (e.g., cash or store-credit), BAS 100 and the system operator may have a payment relationship wherein BAS 100 reimburses the system operator for the rebate value dispensed. In one scenario, the user may establish payment preferences, wherein a user establishes preferred methods of purchase benefit completion. For example, a user may specify that rebate refunds be deposited into a financial account as the preferred method. If this method is unavailable, the system may use the user's secondary preferred method and so on. BAS 100, benefit provider, and/or system operator may have the authority to disregard or override a user's preferences. For example, although a user has not specified receiving a rebate check by mail as one of his preferences, a benefit provider may have authority to disregard user preferences and provide the rebate as a check via mail. During preference configuration, BAS 100 may notify users that such preferences do not guarantee benefit provider compliance.

Once the user has consented to the authorization agreement and established purchase benefit parameters, BAS 100 stores the benefit authorization agreement, purchase benefit parameters, and user information, including user biometric data, in a user record at step 208. The user record may be accessed at subsequent biometric authorizations and a user may reconfigure purchase benefit parameters by updating his user record via an authorization station.

Figure 3:
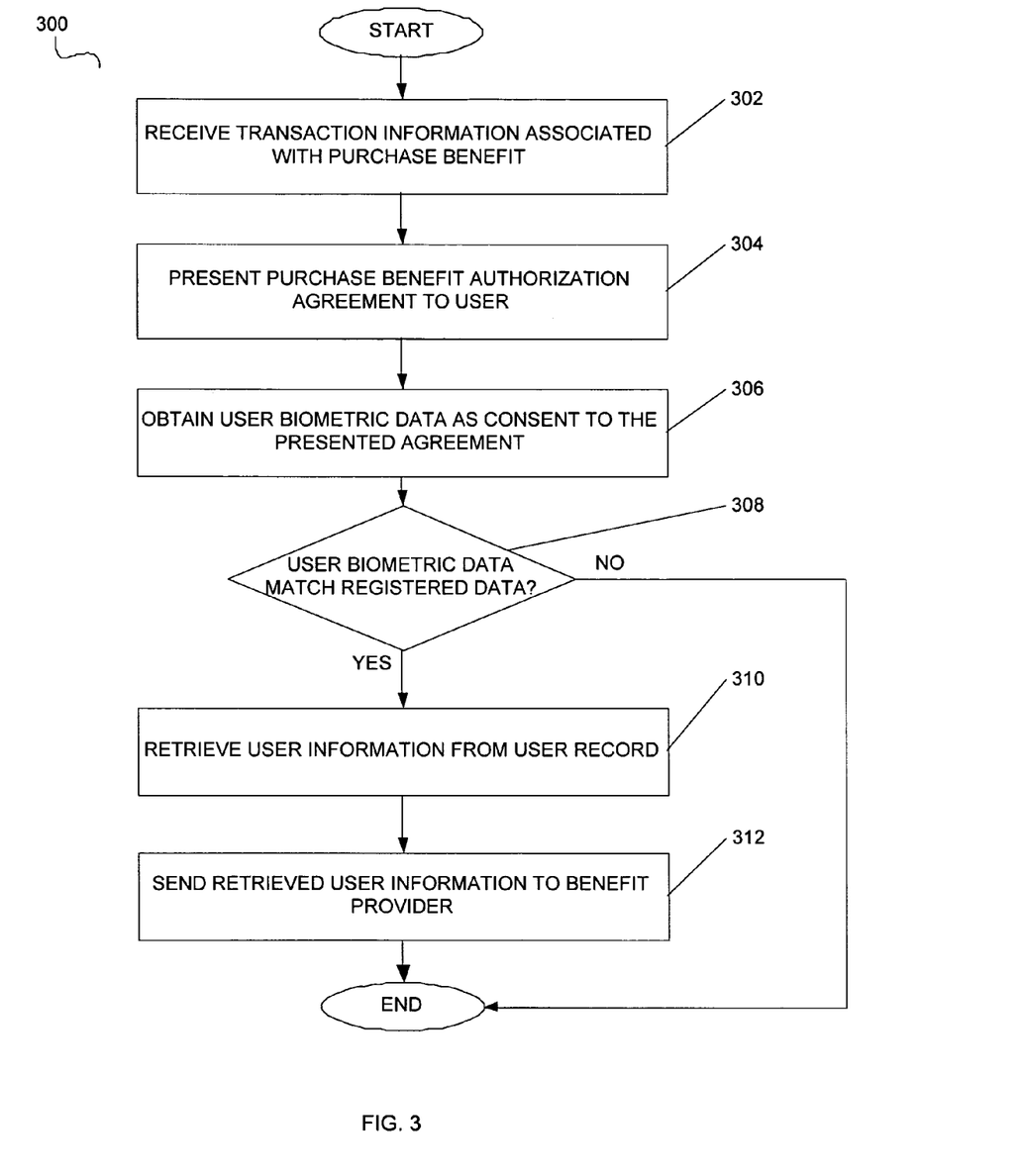
FIG. 3 illustrates a flowchart of a process for providing authorization for purchase benefit transactions in a biometric authorization system during a transaction.

FIG. 3 illustrates a flowchart of a process for providing authorization for benefit transactions in BAS 100 during a transaction. In this process, it is assumed that during enrollment or user record maintenance, a user has provided BAS 100 with biometric data and the information necessary to allow BAS 100 to apply for purchase benefits on his behalf. If enrollment has not yet taken place, then an additional enrollment step would be included prior to step 302. At step 302, BAS 100 receives transaction information associated with a purchase benefit. BAS 100 may receive transaction information on a per item basis or the information may be sent to BAS 100 after all items have been entered in the system and some have been determined to be affiliated with purchase benefits.

If the system determines that purchase benefits are available for one or more items, BAS 100 presents the user with an authorization agreement at step 304. The presentation of the authorization agreement would be implementation dependent and would not limit the scope of the present invention. In one scenario, the authorization agreement may be provided on a point of sale terminal screen. In another scenario, the agreement may be printed during the transaction and presented to the user. The system may present an authorization agreement for each applicable item, a select number of items, or for all the applicable items.

At step 306, the system obtains the user's biometric data. In one embodiment, the biometric data provides consent to one or more authorization agreements. In another embodiment, the user consents to the authorization agreement by selecting an option from a display terminal. Alternatively, the user may consent to the authorization agreement by signing a paper form.

At step 308, BAS 100 determines if the user's biometric data matches registered biometric data stored at database 104. In one embodiment, if the user's biometric data does not match registered biometric data, BAS 100 does not conduct a purchase benefit transaction on the user's behalf. In another embodiment, if the user's biometric does not match, the user is prompted to enroll in BAS 100 and the system may conduct one or more purchase benefits once enrollment is complete. The user may enroll at the point of sale or the user may suspend the purchase transaction until enrollment has been completed at a separate authorization station.

If the user's biometric data matches registered biometric data stored in a user record, the user information in the user record is retrieved at step 310. Retrieval may occur immediately or at a subsequent time as to be determined by implementation. The particular user information retrieved may be dependent upon the type of purchase benefit being processed.

For example, BAS 100 may retrieve financial account information for a rebate transaction but only contact information for a warranty registration.

At step 312, the retrieved user information is sent to the benefit provider for processing. As aforementioned, a benefit provider may be a payor or a warrantor, such as a manufacturer or third-party intermediary. The benefit provider may then process purchase benefit transaction. If the user has established one or more purchase benefit parameters, they may be applied during processing. Alternatively, the benefit provider may conduct the benefit transaction according to its own guidelines.

In one embodiment, BAS 100 may provide a user with manual assistance for purchase benefit completion. Such assistance may be necessary if BAS 100 cannot accomplish one or more steps necessary for purchase benefit completion. In one scenario, BAS 100 may provide the user with one or more preprinted forms, such as a pre-addressed envelope, a rebate form pre-printed with user information, a warranty form pre-printed with user information, or the like. For example, a benefit provider may require the physical product identifier (e.g., UPC) from an item in order to authorize a rebate. BAS 100 may provide the user with an envelope pre-addressed with the benefit provider's address to assist the user in the mailing of the product identifier. The pre-addressed envelope may be provided at the time of sale or the user may print the envelope via a web site affiliated with BAS 100. Alternatively, BAS 100 may provide a pre-addressed label or slip that may be attached to an envelope.

In an additional embodiment, a purchase benefit transaction may require multiple user participation before completion. For example, in order to be eligible for a rebate, multiple users may need to perform a particular action. A set number of users may have to buy a particular item in order for the participating users to receive the rebate.

In another embodiment, users may access their user records to alter information pertaining to benefit transactions that have been processed or are in processing. For example, a user may change residences and may need to update personal information, such as his address, at an authorization station to ensure warranty registration information is accurate or that a rebate check is delivered properly.

In yet another embodiment, transaction information and purchase benefit information stored at database 104 may be used for product identification and transfer. In one scenario, a user may transfer a warranty successfully registered via BAS 100 to another individual by providing the new owner's information at an authorization station. Alternatively, a user may wish to designate that a rebate refund be sent to another individual. A recipient of the purchase benefit transfer may or may not be enrolled in BAS 100. If a recipient is not enrolled, the user may designate the recipient by identification information, such as phone number and/or address. If the recipient is enrolled in BAS 100, the user may be able to locate the recipient via the system by providing identification information, such as name, phone number, address, user identifier (e.g., SID), or the like. In an alternate embodiment, a user may assign a purchase benefit to another individual during a purchase transaction.

In additional embodiment, BAS 100 may assist with return and exchange transactions for purchase benefit items. Transaction information stored in BAS 100 may denote that a rebate refund has been paid for an item and notify a system operator that this amount should not be included in a return or exchange value. Alternatively, if a user exchanges one product for another, the system may notify the user and/or system operator that warranty information needs to be transferred to the new product or the system may transfer such information automatically. Transaction information may be located via a user's biometric data, user identifier (e.g., SID), a product identifier, or other identifying information. By employing a product identifier, the system may locate transaction information even if the item was conveyed to another individual as a gift.

In one embodiment, a radio frequency identification (RFID) may serve as a product identifier. A purchase benefit item may have a unique RFID to assist in purchase benefit issues. Because an RFID is unique, the system may confirm that a product being exchanged or returned is the actual product that was purchased. Additionally, transaction information may designate whether the product was actually purchased and not stolen. Furthermore, as aforementioned, an authorization station may be a wireless device (e.g., cell phone). Such a device may be equipped with an RFID reader and receive purchase benefit data for an item.

In an additional embodiment, a system operator may charge a service fee for purchase benefit transactions. A system operator may view that a service fee is appropriate for the convenience provided or to account for fees charged by BAS 100. The fee may be applied to the total purchase price, applied to the price for a purchase benefit product or, if applicable, may be deducted from a rebate refund. The fee may be a flat charge, be based on a percentage, or a combination thereof. Alternatively, a system operator may charge BAS 100 a fee for allowing it to manage a purchase benefit transaction or may charge both BAS 100 and the user.

In an additional embodiment, BAS 100 may provide one or more reminders to a user to ensure that a purchase benefit is completed. In one scenario, BAS 100 may provide reminders if a benefit provider does not participate with BAS 100. A reminder may be presented to the user in a variety of ways, such as email, a phone call, a mailed notification, or the like. In one scenario, a reminder may prompt the user to complete a purchase benefit process and may provide instructions and other pertinent information. A reminder may be sent once or multiple reminders may be sent on a periodic basis. In one scenario, once a user receives a reminder, he may be given the option to be reminded again later. For example, the user may receive an email reminding him to complete a rebate transaction and stating that a reminder will be sent every week until the rebate is completed. If the user desires to stop receiving the email reminders, the email may provide instructions for reminder cancellation.

In another embodiment, BAS 100 may present one or more purchase benefits provided by one or more benefit providers and one or more secondary providers. A secondary provider may be a system operator, such as a merchant, or an independent benefit provider. In one scenario, a user may select the standard purchase benefit, select the secondary purchase benefit, or a combination thereof. To receive a secondary purchase benefit, a user may have to pay an additional fee. For example, BAS 100 may offer an extended warranty from a secondary provider in addition to the benefit provider's warranty. The secondary benefit may be presented at the time of purchase or via a later notification (such as mail, email, at a later purchase, or the like).

As aforementioned, in addition to rebates and warranties, a purchase benefit may be another consumer reward offered by a benefit provider. A consumer reward may be an offer or promotion presented to entice a user to purchase an item or to provide further benefit once the item has been purchased. For example, a consumer reward may be access to a gift, a subscription to a periodical, an extended warranty, a preferred repair location, peripheral information, a replacement manual, or a troubleshooting contact. In one scenario, the benefit provider may offer such items and services to entice users to agree to receive marketing information. In one embodiment, BAS 100 may offer consumer rewards to encourage users to utilize the system.

In another scenario, a purchase benefit may be a value-added tax (VAT) refund. For example, a traveling user may make a purchase at Harrods in London and employ BAS 100 to receive his VAT refund. Information stored in a user record in BAS 100 may be used to complete the form(s) necessary or the user may manually complete the appropriate form(s). In one scenario, forms and/or identification documents (e.g., identification token, passport, and the like) may be imaged and electronically stored at database 104. The VAT refund may be received as stipulated by a user's purchase benefit transaction parameters. For example, the VAT refund may be deposited in a user financial account or mailed to the user as a negotiable instrument. Alternatively, the user may be required to retrieve the VAT refund at a specified location. In one scenario, a user may undergo biometric authorization before retrieving the VAT refund.

In an additional embodiment, BAS 100 may filter information sent to a user from a benefit provider so that only pertinent information reaches the user. In one scenario, a user that has elected to receive email notifications from a benefit provider may authorize BAS 100 to filter marketing material from the benefit provider. For example, a user may register a warranty on a car seat in order to receive recall information via email, but may not want to receive marketing offers, coupons, and the like. BAS 100 may filter such email to ensure that only recall information is delivered to the user. In another scenario, the user may authorize BAS 100 to filter postal mail from the benefit provider.

A system and method for biometrically conducting purchase benefit transactions has been illustrated. It will be appreciated by those skilled in the art that the system and method of the present invention can be used at a point of sale to conduct purchase benefit transactions in a biometric authorization system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method for biometrically processing a rebate transaction for a user purchasing an item at a merchant location, the method comprising:
   receiving information relating to the item for purchase at a point of sale, said item having an associated rebate offer;
   obtaining biometric data from the user for processing of said rebate offer, wherein biometric data is compared against biometric data stored at a database remote from said point of sale in a record relating to the user to determine a match without the use of a token; and
   upon a match of the biometric data and the stored biometric data, retrieving user identifying information from the user record and transmitting a rebate request to a benefit provider, wherein said rebate request includes the user identifying information and information associated with the rebate offer, wherein funds associated with fulfillment of said rebate request are transferred to a financial account associated with said record relating to the user stored at said remote database.

2. The method of claim 1, wherein said rebate offer is a tax refund.

3. The method of claim 2, further comprising imaging one or more of a tax refund form and an identification token.

4. The method of claim 1, further comprising paying a fee to a system operator for conducting said rebate transaction.

5. The method of claim 1, wherein information necessary for said rebate offer is retrieved from one or more of a point of sale and a user record.

6. The method of claim 5, wherein said information associated with the rebate offer includes one or more product identifiers.

7. The method of claim 6, wherein said product identifier is one of a product code, a radio frequency identification, a barcode, and an identification number.

8. The method of claim 1, further comprising storing a record of said rebate transaction.

9. The method of claim 8, further comprising employing said record during one of a return and an exchange, wherein one of a return value and an exchange value is discounted by said funds associated with fulfillment.

10. The method of claim 1, wherein said comparison transpires at a local device.

11. The method of claim 1, wherein said comparison transpires at a database.

12. The method of claim 1, wherein said financial account is a third-party account.

13. The method of claim 1 wherein the user identifying information comprises information pertaining to the financial account.

14. The method of claim 1 wherein the benefit provider comprises a manufacturer of the item.

15. A method for authorizing a purchase benefit transaction in a biometric authorization system, the method comprising:
   presenting a purchase benefit transaction authorization agreement to a user;
   receiving user consent to said authorization agreement;
   storing said authorization agreement in association with a user record, said user record further including registered biometric data from said user;
   receiving information for a purchase transaction of an item that has an associated purchase benefit transaction, wherein said received information includes transaction biometric data; and
   automatically initiating processing of said purchase benefit transaction on behalf of said user in accordance with said stored authorization agreement upon a match of said transaction biometric data with said registered biometric data that is retrieved from said user record stored at a remote database.

16. The method of claim 15, wherein said processing includes assisting said user with one or more purchase benefit procedures.

17. The method of claim 16, wherein said assisting includes providing said user with one or more of a pre-addressed envelope, a benefit provider address label, a rebate form pre-printed with user information, and a warranty form pre-printed with user information.

18. The method of claim 15, wherein said purchase benefit transaction is one or more of a rebate, a warranty, and a consumer reward.

19. The method of claim 18, wherein if said purchase benefit transaction is a rebate, the form of value for said rebate is one or more of cash, a store-credit token, a store-credit account, a negotiable instrument, and a deposit in a financial account.

20. The method of claim 19, wherein said form of value is determined by one of the biometric authorization system, a system operator, a benefit provider or one or more user preferences.

21. The method of claim 19, further comprising sending a portion of said value to a charity designated by said user.

22. The method of claim 15, wherein said purchase benefit transaction is valid only if one or more parameters are met.

23. The method of claim 22, wherein said parameter is one or more of meeting a set number of participants, spending a set amount, buying an item, providing requested information, consenting to a marketing agreement, and consenting to a product research agreement.

24. The method of claim 15, further comprising charging a fee for conducting said purchase benefit transaction.

25. The method of claim 15, wherein said receiving user consent transpires during one or more of enrollment in said biometric authorization system, a purchase transaction, and a user record update.

26. The method of claim 15, wherein user biometric data is used as user consent to said authorization agreement.

27. The method of claim 15, wherein said authorization agreement appoints legal authority to one or more of said biometric authorization system and a third party.

28. The method of claim 15, further comprising notifying said user of actions necessary to receive said purchase benefit.

29. The method of claim 28, wherein said notifying occurs at a time subsequent to the purchase.

30. The method of claim 29, wherein said notifying occurs a plurality of times.

31. The method of claim 28, wherein said notifying is accomplished via one or more of email, mail, phone, and an authorization station.

32. The method of claim 15, further comprising offering said user the option to authorize one or more additional purchase benefits.

33. A method for authorizing a purchase benefit transaction in a biometric authorization system, the method comprising
 receiving, from a point of sale, purchase item information;
 presenting an authorization agreement to a user purchasing said purchase item, said authorization agreement providing an authorization for processing a purchase benefit transaction for said purchase item on behalf of said user;
 obtaining user biometric data;
 determining if said user biometric data matches registered biometric data stored in association with a user record; and
 if said obtained user biometric data matches said registered biometric data, processing said purchase benefit transaction using information stored in association with said user record, wherein said user record is stored at a remote database.

34. The method of claim 33, wherein said purchase benefit transaction is one or more of a rebate, a warranty, and a consumer reward.

35. The method of claim 33, wherein said presenting occurs at an authorization station.

36. The method of claim 35, wherein said authorization station is a point of sale.

37. The method of claim 33, further comprising charging a fee for processing said purchase benefit transaction.

38. The method of claim 33, wherein said user biometric data is used as user consent to said authorization agreement.

39. The method of claim 33, wherein said processing includes assisting said user with one or more purchase benefit procedures.

40. The method of claim 39, wherein said assisting includes providing said user with one or more of a pre-addressed envelope, a benefit provider address label, a rebate form pre-printed with user information, and a warranty form pre-printed with user information.

41. The method of claim 33, further comprising registering said purchase item on behalf of another individual at the time of purchase.

42. The method of claim 33, further comprising transferring said purchase benefit to another individual.

43. A method for authorizing a warranty registration transaction in a biometric authorization system, the method comprising:
 receiving information relating to an item for purchase at a point of sale, said item being predisposed for a warranty registration offer;
 obtaining biometric data from a user for processing said warranty registration offer, wherein said biometric data is compared against biometric data stored in a record relating to the user to determine a match without use of a token; and
 upon a match of the biometric data and the stored biometric data, retrieving user identifying information from said record and transmitting a registration request to a benefit provider, wherein said registration request includes said user identifying information and information relating to the item.

44. The method of claim 43, further comprising paying a fee to a system operator for conducting said warranty registration transaction.

45. The method of claim 43, wherein said information relating to the item includes one or more product identifiers.

46. The method of claim 45, wherein said product identifier is one of a product code, a radio frequency identification, a barcode, and an identification number.

47. The method of claim 43, further comprising transferring said warranty registration to another individual.

48. The method of claim 47, wherein said transferring occurs at an authorization station.

49. The method of claim 43, further comprising updating said warranty registration via an authorization station.

* * * * *